(12) United States Patent
Kim et al.

(10) Patent No.: US 11,245,151 B2
(45) Date of Patent: Feb. 8, 2022

(54) BATTERY MODULE

(71) Applicants: Hyundai Motor Company, Seoul (KR); Kia Motors Corporation, Seoul (KR)

(72) Inventors: Tae Hyuck Kim, Chungcheongnam-do (KR); Yun Ho Kim, Gyeonggi-do (KR); Hae Kyu Lim, Gyeonggi-do (KR); Yong Hwan Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/400,813

(22) Filed: May 1, 2019

(65) Prior Publication Data
US 2020/0152931 A1 May 14, 2020

(30) Foreign Application Priority Data
Nov. 12, 2018 (KR) .................. 10-2018-0138388

(51) Int. Cl.
| | | |
|---|---|---|
| *H01M 50/20* | (2021.01) | |
| *H01M 10/613* | (2014.01) | |
| *H01M 10/653* | (2014.01) | |
| *H01M 10/6556* | (2014.01) | |
| *H01M 10/6568* | (2014.01) | |

(52) U.S. Cl.
CPC ......... *H01M 50/20* (2021.01); *H01M 10/613* (2015.04); *H01M 10/653* (2015.04); *H01M 10/6556* (2015.04); *H01M 10/6568* (2015.04); *H01M 2220/20* (2013.01)

(58) Field of Classification Search
CPC ............ H01M 2/1077; H01M 10/613; H01M 10/653; H01M 50/20; H01M 10/6568; H01M 10/6563
See application file for complete search history.

(56) References Cited

U.S. PATENT DOCUMENTS

| | | | | |
|---|---|---|---|---|
| 2009/0214936 A1* | 8/2009 | Yang | .................... | G01R 31/364 429/61 |
| 2014/0038012 A1* | 2/2014 | Alimario | ............. | H01M 10/613 429/72 |
| 2015/0037662 A1* | 2/2015 | Pinon | .................. | H01M 50/502 429/179 |

FOREIGN PATENT DOCUMENTS

| | | |
|---|---|---|
| DE | 10-2005-031504 A1 | 1/2007 |
| EP | 2 523 249 A2 | 11/2012 |
| EP | 3 343 691 A1 | 7/2018 |
| KR | 10-2016-0105360 A | 9/2016 |
| KR | 20180036863 A | 4/2018 |
| KR | 20180068379 A | 6/2018 |
| KR | 10-2019-0043277 A | 4/2019 |
| KR | 10-2019-0139553 A | 12/2019 |
| KR | 10-2020-0001692 A | 1/2020 |

(Continued)

*Primary Examiner* — Olatunji A Godo
(74) *Attorney, Agent, or Firm* — Mintz Levin Cohn Ferris Glovsky and Popeo, P.C.; Peter F. Corless

(57) ABSTRACT

A battery module is provided that includes a module frame having a top and sides that extend down from two sides of the top. A cell-stacking structure is disposed between the sides of the module frame and include a plurality of stacked battery cells. A bottom plate is disposed under the cell-stacking structure and is bonded to the lower ends of the sides of the module frame.

7 Claims, 3 Drawing Sheets

(56) References Cited

FOREIGN PATENT DOCUMENTS

WO 2018/008866 A1 1/2018

\* cited by examiner

BATTERY MODULE

CROSS REFERENCE TO RELATED APPLICATION

The present application claims priority of Korean Patent Application No. 10-2018-0138388 filed on Nov. 12, 2018, the entire contents of which are incorporated herein for all purposes by this reference.

BACKGROUND

1. Field of the Disclosure

The present disclosure relates to a battery module, and more particularly, to a battery module having a simplified structure and high energy density.

2. Description of the Prior Art

Batteries are generally mounted within vehicles to store electrical energy and a battery module outputs a predetermined voltage by connecting a plurality of battery cells, each of which outputs a unit voltage. A plurality of the battery modules are connected to output a desired voltage. Battery modules of the related art include cartridges for fixing battery cells. In other words, battery modules of the related art have a structure with cartridges between stacked battery cells. Additionally, the battery modules of the related art further include cooling fins disposed between battery cells in surface contact with the battery cells. The ends of the cooling fins indirectly discharge heat from the battery cells by coming into contact with a cooling block.

As described above, since battery modules of the related art use cartridges, the size of the structure of stacked battery cells is increased. In particular, the module size is further increased by the cooling fins. Battery modules of the related art also use an indirect cooling method that discharges heat from battery cells using heat transfer through cooling fins disposed between the battery cells and thus, cooling efficiency is reduced.

The description provided above as a related art of the present disclosure is merely for helping understanding the background of the present disclosure and should not be construed as being included in the related art known by those skilled in the art.

SUMMARY

The present disclosure provides a battery module that allows for simplifying and downsizing of a structure by reducing the number of parts and can achieve high energy density by securing an excellent heat dissipation ability.

In accordance with an aspect of the present disclosure, a battery module may include: a module frame having a top and sides that extend down from the top; a cell-stacking structure disposed between the both sides of the module frame and including a plurality of stacked battery cells; and a bottom plate disposed under the cell-stacking structure and bonded to lower ends of the sides of the module frame.

In an exemplary embodiment of the present disclosure, the battery cells may be stacked in surface contact with one another from a first side to a second side of the module frame. In addition, the cell-stacking structure may further include surface pressure pads disposed between some of the battery cells (e.g., a predetermined number of the battery cells) to be compressed in the stacking direction of the battery cells. The battery cells each may have electrode cell taps on both ends and may be stacked with the cell taps facing a front portion and a rear portion of the module frame.

An exemplary embodiment of the present disclosure may further include a heat transfer substance disposed between the cell-stacking structure and the bottom plate. The heat transfer substance may be a gap filler of which thermal conductivity is increased by pressure and the bottom plate may be bonded to lower ends of the sides of the module frame while being pressed toward the cell-stacking structure. The bottom plate may be bonded to lower ends of the sides of the module frame with the sides of the module frame pressed toward the cell-stacking structure.

An exemplary embodiment of the present disclosure may further include a cooling water block attached to the bottom of the bottom plate to supply cooling water to the bottom of the bottom plate. A front cover and a rear cover made of an insulating material may be respectively coupled to the front portion and the rear portion of the module frame. In particular, the front cover and the rear cover each may have separation walls that extend between pairs of bonded cell taps on surfaces facing the cell taps.

According to the battery module, since a module frame has a structure with a top and sides that extend from both ends of the top and battery cells are stacked with sides facing one another, specific cartridges for stacking the battery cell may be omitted and thus, the module may be downsized. Further, since the bottom of the module frame is open, it may be possible to more easily apply a heat transfer substance to the bottom of the cell-stacking structure after disposing the cell-stacking structure having the stacked battery cells between both sides of the module frame. According to the battery module, since a bottom plate may be bonded to the module frame while being pressed toward the cell-stacking structure after the heat transfer substance is applied, when a heat transfer substance of which thermal conductivity is increased as pressure is increased is used, a heat transfer effect may be considerably improved.

As described above, according to the battery module, cooling performance may be improved by reducing the size and the heat transfer ability of the battery module may be improved. Therefore, high energy density of the battery module may be achieved. Further, according to the battery module, by bonding the bottom plate to the module frame while pressing both sides of the module frame toward the cell-stacking structure after disposing the cell-stacking structure between both sides of the module frame, the battery module may be manufactured with a predetermined level of surface pressure between the battery cells and thus, the initial performance of the battery module may be improved.

The effects of the present disclosure are not limited to the effects described above and other effects may be clearly understood by those skilled in the art from the following description.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A battery module according to various exemplary embodiments of the present disclosure is described hereafter in detail with reference to the accompanying drawings.

Figure 1:
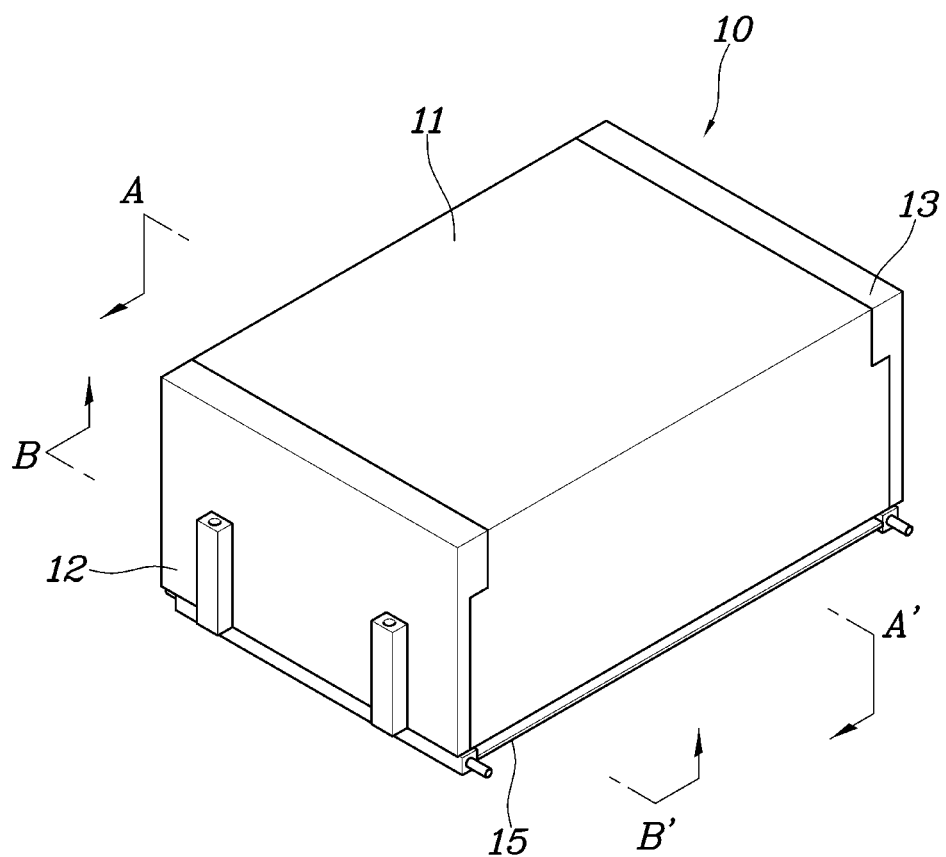
FIG. 1 is a perspective view of a battery module according to an exemplary embodiment of the present disclosure.
Figure 2:
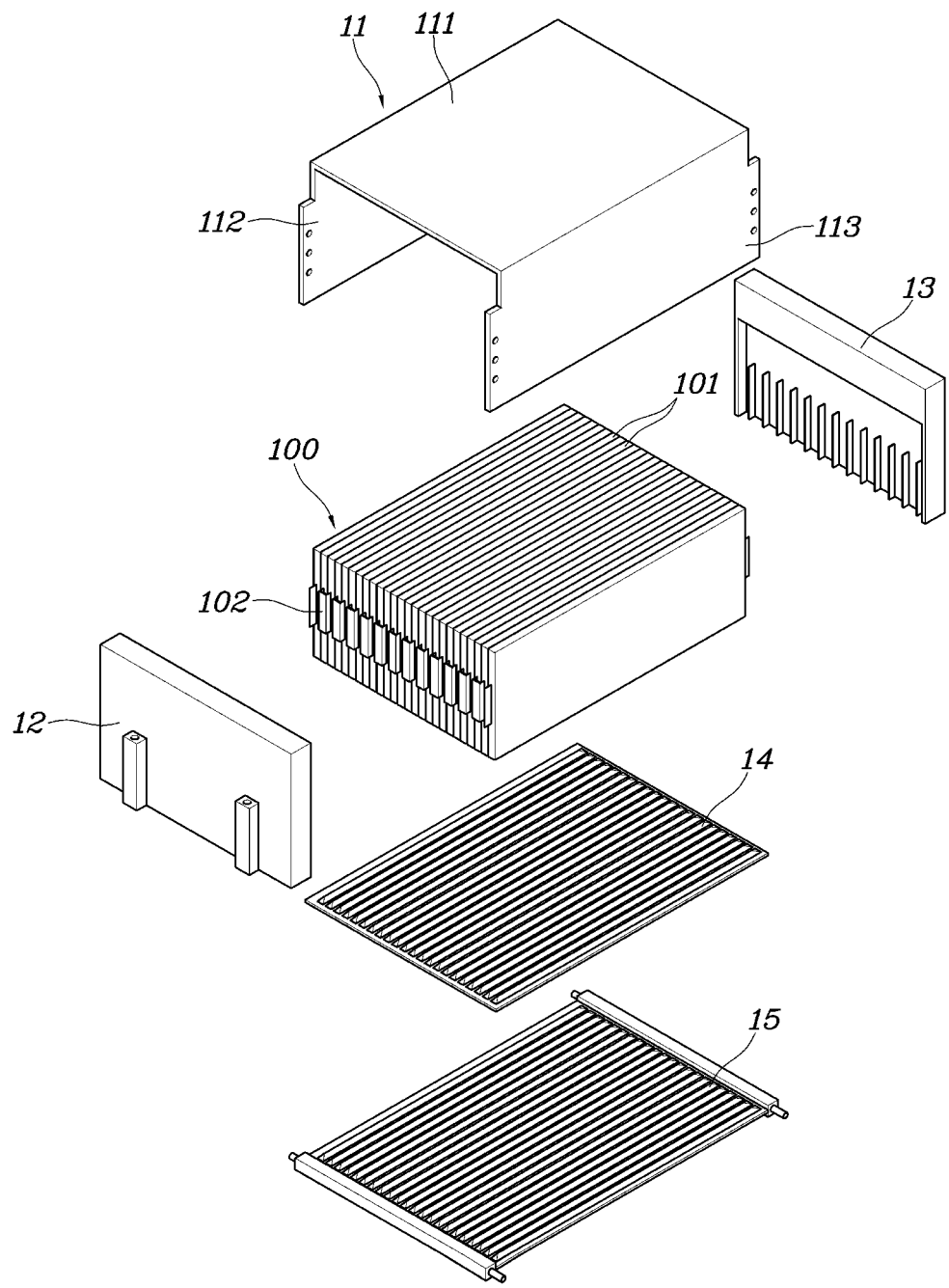
FIG. 2 is a detailed view of the battery module according to an exemplary embodiment of the present disclosure shown in FIG. 1.
Figure 3:
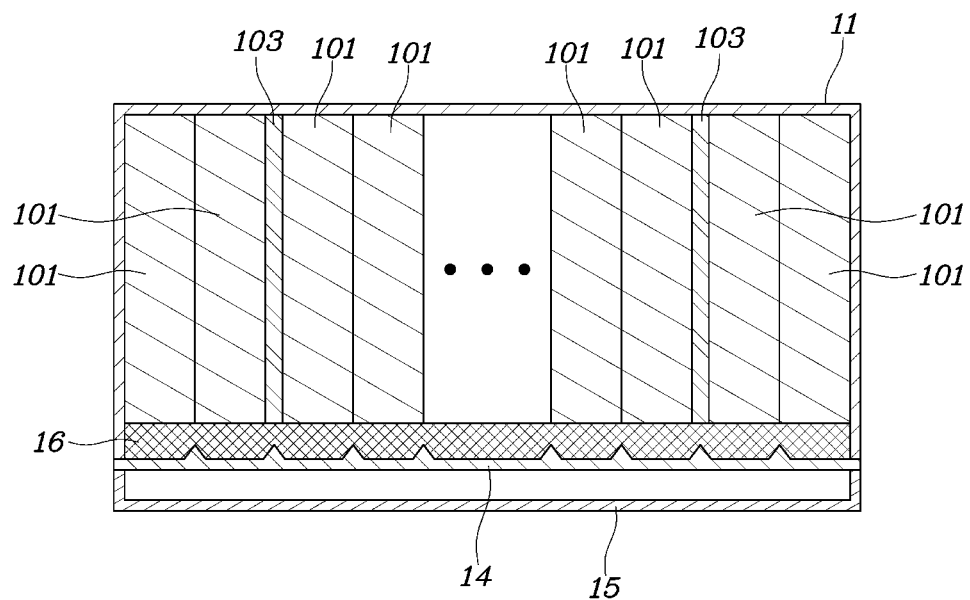
FIG. 3 is a cross-sectional view of the battery module of FIG. 1 according to an exemplary embodiment of the present disclosure taken along line A-A'.

FIG. 1 is a perspective view of a battery module according to an exemplary embodiment of the present disclosure, FIG. 2 is a detailed view of the battery module according to an exemplary embodiment of the present disclosure shown in FIG. 1, and FIG. 3 is a cross-sectional view of the battery module of FIG. 1 according to an exemplary embodiment of the present disclosure taken along line A-A'.

Referring to FIGS. 1 to 3, a battery module according to an exemplary embodiment of the present disclosure may include: a module frame 11 having a top 111 and sides 112 and 113 that extend down from the top 111; a cell-stacking structure 100 disposed between both sides 112 and 113 of the module frame 11 and including a plurality of stacked battery cells 101; and a bottom plate 14 disposed under the cell-stacking structure 100 and bonded to the lower ends of the sides 112 and 113.

The module frame 11 functions as a case that covers and encloses the top and two sides of the battery module and may include the top 111 (e.g., a top surface) and the sides 112 and 113 (e.g., a first side surface and a second side surface) that extend down from the top. In other words, the module frame 11 may have a rectangular parallelepiped shape with the front, rear, and bottom removed. The top 111 and the sides 112 and 113 of the module frame 11 may be formed integrally by extruding a metallic material such as aluminum. The cell-stacking structure 100 in which a plurality of battery cells 101 is stacked in parallel in surface contact with one another may be disposed between both sides 112 and 113 of the module frame 11.

The cell-stacking structure 100 may be formed by stacking a plurality of cells 101 having a pouch shape in surface contact with one another. The battery cells 101 may each have a cell tap 102 that functions as an electrode thereof. Additionally, the battery cells 101 may be stacked in the cell-stacking structure 100 from a first side 112 to a second side 113 of the module frame 11, and the cell taps 102 of the battery cells 101 may be arranged to face the front portion and the rear portion of the module frame 11 (e.g., protrude toward 12 and 13). The cell-stacking structure 100 may include a surface pressure pad 103 capable of being compressed in the stacking direction between the stacked cells 101. The surface pressure pad 103 may attenuate and generate uniform the surface pressure acting between the stacked battery cells 101.

In an exemplary embodiment of the present disclosure, the cell-stacking structure 100 may omit specific cartridges and the outermost cells 101 of the cell-stacking structure 100 may be in contact with the sides 112 and 113 of the module frame 11. In other words, in an exemplary embodiment of the present disclosure, the module frame 11 functions as a case of the battery module 10 and functions as a frame inside which the cell-stacking structure 100 is installed. Accordingly, specific cartridges may be omitted from the structure when stacking battery cell and thus, a battery module may be downsized.

Further, the bottom plate 14 may be disposed under the cell-stacking structure 100 after the cell-stacking structure 100 is disposed between the sides 112 and 113 of the module frame 11, and may be bonded to the sides 112 and 113 of the module frame 11 by welding or other bonding methods. In particular, the bottom plate 14 may be brought in contact with the cell-stacking structure 100 through a heat transfer substance 16. The heat transfer substance 16 may be provided to enable heat generated from the cell-stacking structure 100 including the battery cells 101 to transfer to the bottom plate 14.

The heat transfer substance 16 may be a gap filler having excellent thermal conductivity. When the heat transfer substance 16 is liquid, it may be applied to the bottom of the cell-stacking structure 100 disposed between the sides 112 and 113 of the module frame 11 during the process of manufacturing the battery module. According to an exemplary embodiment of the present disclosure, since the bottom of the module frame 11 is open, the heat transfer substance 16 may be applied more easily. If necessary, the heat transfer substance 16 may be applied to the entire bottom, exposed through the open bottom, of the cell-stacking structure 100 or may be applied in various patterns such as a zigzag shape.

In particular, in an exemplary embodiment of the present disclosure, when a gap filler of which the thermal conductivity is increased, as pressure is increased, is used as the heat transfer substance 16, the ability to transmit heat generated from the cell-stacking structure 100 to the bottom plate 14 may be improved by welding the bottom plate 14 to the lower ends of the sides 112 and 113 of the module frame 11 while pressing the bottom plate 14 toward the cell-stacking structure 100.

The bottom plate 14 may be bonded to the lower ends of the sides 112 and 113 of the module frame 11 by welding or other bonding methods with the sides 112 and 113 of the module frame 11 pressed toward the cell-stacking structure 100. The performance of a battery module may be improved when a predetermined level of uniform surface pressure is maintained between battery cells stacked in the battery module. In addition, the lower ends of the sides 112 and 113 of the module frame 11 may be freely moved in some extent and thus, sufficient surface pressure may be applied between the battery cells 101 in the cell-stacking structure 100 by attaching the bottom plate 14 to the module frame 11 using welding or other bonding methods while pressing the sides 112 and 113 of the module frame 11 toward the cell-stacking structure, whereby it may be possible to improve the performance of the battery module.

The battery module 10 according to an exemplary embodiment of the present disclosure may further include a cooling water block 15 attached to the bottom of the bottom plate 14. In particular, a cooling water pattern through which cooling water flows may be engraved (e.g., a groove passage may be formed) on the cooling water block 15 when seen from the bottom plate 14 and edges of the cooling block 15 may be bonded to the bottom of the bottom plate 14 and thus, cooling water flowing through the cooling water pattern may come in direct contact with the bottom plate 14. According to this structure, the heat generated from the cell-stacking structure 100 including the battery cells 101 may transfer to the cooling water flowing on the cooling water block 15 through the heat transfer substance 16 and the bottom plate 14.

As described above, the battery module 10 according to an exemplary embodiment of the present disclosure has a shortened heat transfer path through which the heat transfers to the cooling water through the bottom plate 14 and the heat transfer substance 16 being in direct contact with the battery cells 101 that generates the heat, thus improving cooling performance. Additionally, by reducing the size and improving the cooling performance of the battery module 10, the battery module 10 may output greater or equal level of energy with a relatively small size in comparison to battery modules of the related art and thus, energy density may be improved.

The battery module 10 according to an exemplary embodiment of the present disclosure may further include a front cover 12 and a rear cover 13 that are coupled to the front portion and the rear portion of the module frame 11. The inner sides of the front cover 12 and the rear cover 13 face the cell taps 102 on the battery cells 101 of the cell-stacking structure 100. In an exemplary embodiment of the present disclosure, the front cover 12 and the rear cover 13 may be made of an insulating material. The insulating material thus provides an overall insulating effect to the structure.

Figure 4:
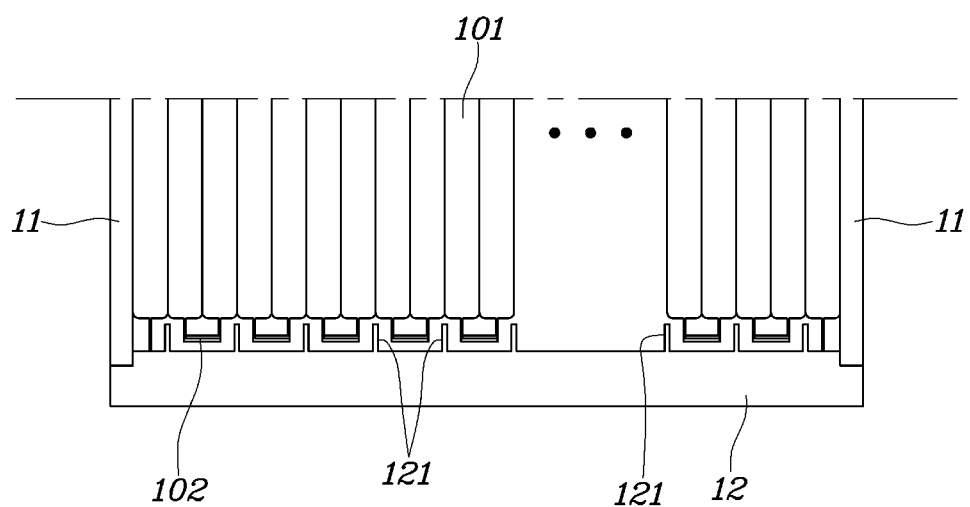
FIG. 4 is a cross-sectional view of the battery module of FIG. 1 according to an exemplary embodiment of the present disclosure taken along line B-B'.

FIG. 4 is a cross-sectional view of the battery module of FIG. 1 according to an exemplary embodiment of the present disclosure taken along line B-B'. Referring to FIG. 4, the cell taps 101 included in the battery cells 101 may be bonded to one another to form electrical connection with the cell taps 102 of adjacent battery cells 101. In general, cell taps may be bonded such that battery cells included in battery modules are connected in series, and thus, a pair of cell taps bonded to each other may be insulated from another adjacent pair of cell taps.

In an exemplary embodiment of the present disclosure, the front cover 12 and the rear cover 13 may have separation walls 121 that extend between pair of cell taps bonded to each other on the surfaces facing the cell taps 102. Accordingly, even when pairs of bonded cell taps are bent or broken toward adjacent pairs of cell taps by a shock etc., insulation between the pairs of cell taps may be maintained by the separation walls 121 without a short with adjacent pairs of cell taps.

Although the present disclosure was provided above in relation to specific exemplary embodiments shown in the drawings, it is apparent to those skilled in the art that the present disclosure may be changed and modified in various ways without departing from the scope of the present disclosure, which is described in the following claims.

What is claimed is:

1. A battery module, comprising:
   a module frame having a top and sides that extend down from the top;
   a cell-stacking structure disposed between the sides of the module frame and including a plurality of stacked battery cells;
   a bottom plate disposed under the cell-stacking structure and bonded to lower ends of the sides of the module frame,
   wherein the cell-stacking structure further includes surface pressure pads disposed between a predetermined number of the battery cells to be compressed in a stacking direction of the battery cells,
   wherein the battery cells each include electrode cell taps on both ends thereof, and the battery cells are stacked with the cell taps facing a front portion and a rear portion of the module frame,
   wherein the battery module further includes a front cover and a rear cover made of an insulating material and respectively coupled to the front portion and the rear portion of the module frame, and
   wherein the front cover and the rear cover each have separation walls that extend between pairs of bonded cell taps on surfaces facing the cell taps.

2. The battery module of claim 1, wherein the sides of the module frame include a first side and a second side and the battery cells are stacked with one another from the first side to the second side of the module frame.

3. The battery module of claim 1, further comprising:
   a heat transfer substance disposed between the cell-stacking structure and the bottom plate.

4. The battery module of claim 3, wherein the heat transfer substance is a gap filler of which thermal conductivity is increased by pressure and the bottom plate is bonded to lower ends of the sides of the module frame while being pressed toward the cell-stacking structure.

5. The battery module of claim 2, wherein the bottom plate is bonded to lower ends of the sides of the module frame with the sides of the module frame pressed toward the cell-stacking structure.

6. The battery module of claim 1, further comprising:
   a cooling water block attached to the bottom of the bottom plate to supply cooling water to the bottom of the bottom plate.

7. The battery module of claim 1, further comprising:
   a cooling water pattern engraved on the cooling water block and through which cooling water flows.

* * * * *